United States Patent [19]

Hahn

[11] Patent Number: 5,142,743
[45] Date of Patent: * Sep. 1, 1992

[54] ADJUSTABLE BUNDLING DEVICE

[76] Inventor: Blake S. Hahn, 529 Van Ness Ave., Torrance, Calif. 90501

[*] Notice: The portion of the term of this patent subsequent to Jul. 10, 2007 has been disclaimed.

[21] Appl. No.: 550,252

[22] Filed: Jul. 9, 1990

Related U.S. Application Data

[63] Continuation-in-part of Ser. No. 241,010, Sep. 2, 1988, Pat. No. 4,939,818.

[51] Int. Cl.$^5$ ............................................. B65D 63/00
[52] U.S. Cl. .................................... 24/16 R; 24/442
[58] Field of Search ............. 24/306, 442, 16 R, 44 R; 128/DIG. 15, DIG. 26, 169, 165; 2/DIG. 6; 224/901; 604/179, 180

[56] References Cited

U.S. PATENT DOCUMENTS

| D. 308,465 | 6/1990 | Hietter | D8/356 |
| 3,480,012 | 11/1969 | Smithers et al. | 128/DIG. 15 |
| 3,994,048 | 11/1976 | Rosenthal | 24/16 R X |
| 4,088,136 | 5/1978 | Hasslinger et al. | 128/DIG. 26 |
| 4,091,808 | 5/1978 | Nelson | 128/DIG. 15 |
| 4,481,682 | 11/1984 | Hall | 2/DIG. 6 |
| 4,700,432 | 10/1987 | Fennell | 24/16 R |
| 4,815,172 | 3/1989 | Ward | 24/16 R |
| 4,939,818 | 7/1990 | Hahn | 24/442 X |

OTHER PUBLICATIONS

Seam Tech Brochure of the RIP-TIE ™ Product (undated).

Primary Examiner—James R. Brittain
Attorney, Agent, or Firm—Lyon & Lyon

[57] ABSTRACT

A self-attaching, self-adjusting, and reusable bundling device for wrapping and securing bundles of cable, rope, hose, electrical power supply cords and other objects. The bundling device includes a two-sided, three section strap using glued, stitched, sonic welded or otherwise attached hook and loop type materials such as those known and distributed under the VELCRO trademark assembled to each other in specific combinations. The invention uses no auxiliary rings or loops to assist in tightening.

12 Claims, 4 Drawing Sheets

ADJUSTABLE BUNDLING DEVICE

RELATED APPLICATION DATA

This application is a continuation-in-part of copending application Ser. No. 241,010 filed Sep. 2, 1988 now U.S. Pat. No. 4,939,818 issuing Jul. 10, 1990.

Background of the Invention

The field of the present invention relates to bundling devices that assist in convenient storage of lengthy items. These items would include cable, rope, hose, electrical power supply cords, and many other lengthy, flexible items.

Many, if not all people experience the need to store a piece of rope, cable, hose, or an electrical power cord. These items are typically stored for a period of time and then taken out of storage and reused. These items are usually coiled or bundled in some fashion to allow for convenient storage.

There are many methods and devices to assist in this regard. The trailing end of the rope, for instance may be wrapped around the bundled coil and tucked in such a way as to bind the coil together. This process is frequently used with cables, hoses, and electrical power supply cords but it is time consuming and unless skillfully done, does not result in a secure bundle. As a typical experience would probably demonstrate, the tendency of such bundling is to become loose, unravel and leave the coil in disarray.

Another method would be to use one of many devices to tie the bundle together. A piece of twine will work, but it must be drawn tight and properly tied. Often the knot unravels, leaving the coil a mess, or the knot becomes hard and nearly impossible to untie.

A rubber band may be used, and many heavy grades are available. Such bands become detached and displaced when needed. Rubber bands are difficult to wrap and tension properly. Rubber bands often rot or oxidize and break in relatively short time. Again the coil is in disarray.

Electricians are familiar with products generally known as wire ties. These devices allow a cinching of bundles of wires, some are reusable, but most are designed for one time use. They have a loop at one end that receives the other end. Their use requires threading of the loop which requires two hands for a majority of uses leaving no hands to hold the coil, and therefore resulting in a more difficult assembly. There is also a loose end of the tie protruding from the side of the bundle.

Twist ties of vinyl coated wire have been used for the bundling of these materials, but they typically are not attached to the cable or electric power supply cord. Similar to rubber bands, they are easily lost. Twist ties are also subject to fatigue and are easily broken upon re-use.

Tape has been used for bundling purposes. The adhesives deteriorate and the tape lets loose. The adhesive leaves sticky residue on the item bundled. Murphy's law dictates that rolls of tape are not available when you need them.

Hook and loop devices, sold under the trademark VELCRO, for bundling exist, but with a metal or plastic ring to assist in tightening the device.

It is therefore desirable to have a device that allows easy, convenient, self adjusting, reusable, and reliable bundling of these items, such a device would preferably requires no auxiliary ring.

OBJECTS AND ADVANTAGES

Therefore it is an object of the present invention to provide for convenient bundling of items.

It is another object to provide a device to easily, neatly, and reliably retain a bundle of cable, rope, hose, electric power supply cord, or other length of flexible material, to provide such a device that attaches to the object to be bundled in a secure but adjustable manner, so the device is always available at the moment the bundle is to be secured, to provide a device that is self adjusting, reusable, and transferrable to another item in need of bundle retention.

Preferably the device will allow wrapping of the bundle with one hand and freeing the other hand to hold the bundle, to provide a device that requires minimum training or skill to use, and to provide such a device that is useable underwater or in salt air without corrosion.

Further objects and advantages of the invention may be drawn from consideration of the ensuing description and accompanying drawings.

DETAILED DESCRIPTION OF PREFERRED EMBODIMENTS

The preferred embodiments will now be described with reference to the drawings. Relative directions are arbitrarily defined to assist in describing the device. One side of the device has been arbitrarily defined as the top and the other side has been arbitrarily defined as the bottom from a perspective as viewed in the figures. Of course the device can be turned over or oriented into any position.

The device is an easy to use strap of hook and loop material, permanently assembled by glue, stitching, or sonic welding. It may be of various widths and lengths but it has the particular construction described and illustrated hereafter.

Hook and loop material, commercially available under the trademark VELCRO, is a fabric-like material which consists of two parts, a "loop" portion which adheres to a "hook" portion. The parts will pull apart with some effort and re-adhere whenever the two different parts are pressed together.

Figure 1:
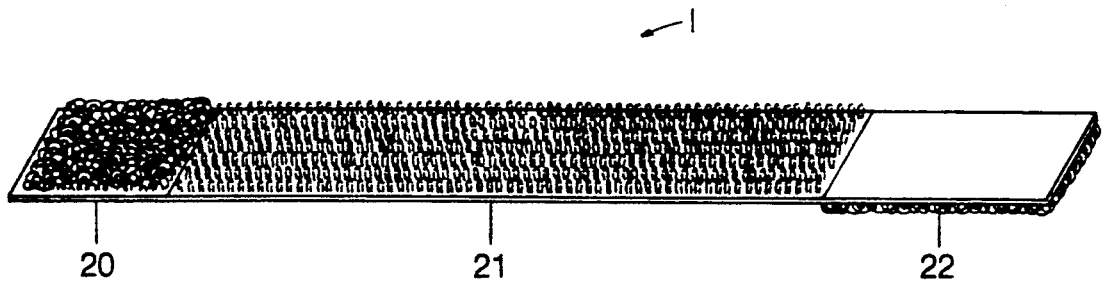
FIG. 1. shows a perspective front elevation view of the device according to the invention hereafter to be known as the type 1 variation.

In FIG. 1, a bundling device 1 is constructed from a strip of material combining the two VELCRO parts in three sections, 20, 21, and 22. The sections are assembled in the illustrated order, position, and relative length. The center section 21 has hook material on the top side thereof and forms the longest section of the strap 1. The length of this section varies depending on the overall length of the strap depending on the particular application. The first end section 20 has loop material on the top side thereof. The length of this section varies depending on the overall length of the strap, but this is usually the shortest section. The second end section 22 has loop material on the bottom side thereof and has a length which varies depending on the overall length of the strap. The second end section 22 is usually longer than the first end section 20 but shorter than the center section 21. The overall length and width of the device 1 varies with the particular application.

Operationally, the strap device 1 is not reversible, it must be attached to the item to be bundled with the top of the first end section 20 against the top of the center section 21 and must be wrapped with hook of the center section 21 facing out.

The sections 20, 21, and 22 are attached to each other with glue, stitching, or a process called sonic welding. In some cases, canvas or nylon strapping may be attached to the backing of the VELCRO materials to add strength to the strap. The center section 21 may be alternately constructed with hook fastener material on both the top and bottom sides thereof.

Figure 2:
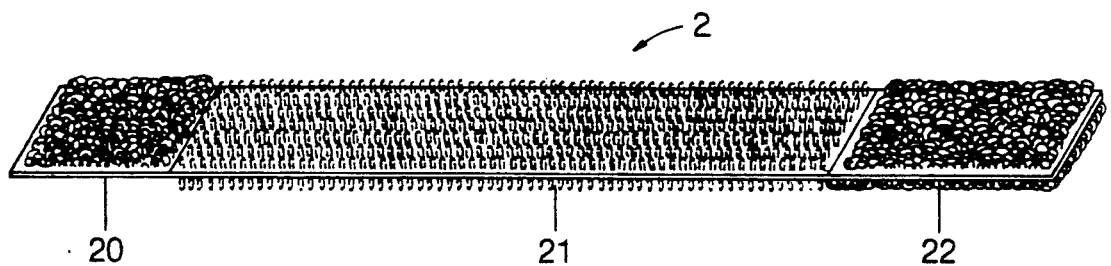
FIG. 2. shows a perspective front elevation view of the device according to the invention hereafter to be known as the type 2 variation.

FIG. 2 shows an alternate bundling device 2 which also has three sections. The first end section 20, consists of loop type VELCRO material on the top side of the strap for a short distance. The length of the first end section 20 varies depending on the overall length of the strap, but is usually the shortest section. The center section 21 has hook type VELCRO material on both top and bottom sides forming the longest section of the bundling strap 2. The length of this section varies depending on the overall length of the strap, but this is the longest section.

The second end section 22 of the strap 2 has loop type VELCRO material on both top and bottom sides thereof. The length of this section varies depending on the overall length of the strap. This section is usually longer than the first end section 20 but shorter than the center section 21.

Operationally, the bundling strap 2 first end section 20 is not reversible but the rest of the device 2 is reversible, and is not wrap direction dependent.

Figure 3:
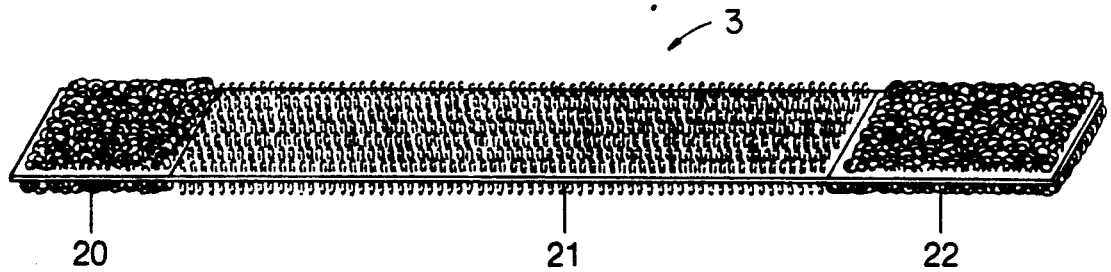
FIG. 3. shows a perspective front elevation view of the device according to the invention hereafter to be known as the type 3 variation.

FIG. 3 shows another bundling device 3 having a first end section 20 which has loop type VELCRO material on both top and bottom sides of thereof for a short distance. The length of this section varies depending on the overall length of the strap, but this usually is the shortest section.

The center section 21 has hook type VELCRO material on both top and bottom sides to form the longest section of the strap. The length of this section varies depending on the overall length of the strap, but this is the longest section.

The second end section 22 has loop type VELCRO material again on both the top and bottom sides of the strap 3. The length of this section varies depending on the overall length of the strap. This section is usually longer than the first end section 20, but shorter than the center section 21.

The bundling straps 1, 2 and 3 allow more convenience and personal preference in application. The basic operation is the same for all types. In use, the strap 3 is completely reversible and is not wrap directional dependent.

Figure 3A:
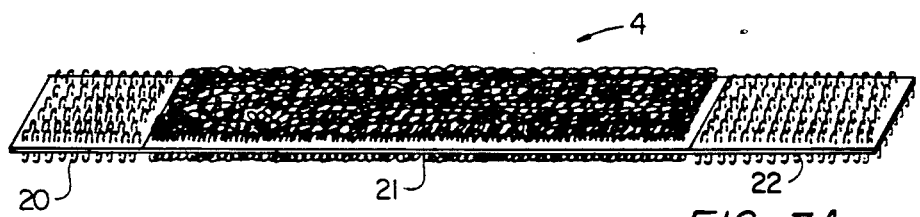
FIG. 3A shows a perspective front elevation view of a device similar to the one in FIG. 3 but having reversed location for the hook and loop materials.

Though the devices have been described having loop fastening material on the end portions and hook fastening material on the center portion, the reverse could be made placing hook fastening material on the end portions and loop fastening on the center portion. FIG. 3A illustrates such an alternate bundling device 4. Bundling device 4 is a reverse construction of the device 3 of FIG. 3. Device 4 has hook material on both the top and bottom sides of first end portion 20, loop material on both the top and bottom sides of center portion 21, and hook material on both the top and bottom sides of the second end portion 22. The other embodiments disclosed herein may be similarly reverse constructed interchanging hook material for loop material and vice versa.

The sequence of operation of the invention is shown in four steps in FIGS. 4a, 4b, 4c, and 4d.

Figure 4A:
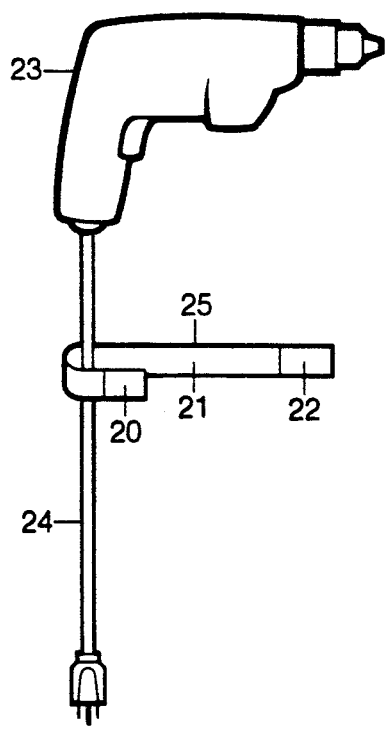
FIGS. 4a, 4b, 4c, and 4d show views of the device in four stages wrapping the electric power supply cord of an electric drill.

In FIG. 4a, the bundling device is attached to the power supply cord 24 of an electric drill 23 by placing the cord 24 over the device at the intersection of the first end section 20 and center section 21. The first end section 20 is then wrapped over the cord 24 and pressed into the center section 21 to form a snug loop around the cord. Type 1 and 2 devices must have the top surface loop end section 20 facing the cord. Type 3 and 4 devices are completely reversible.

Figure 4B:
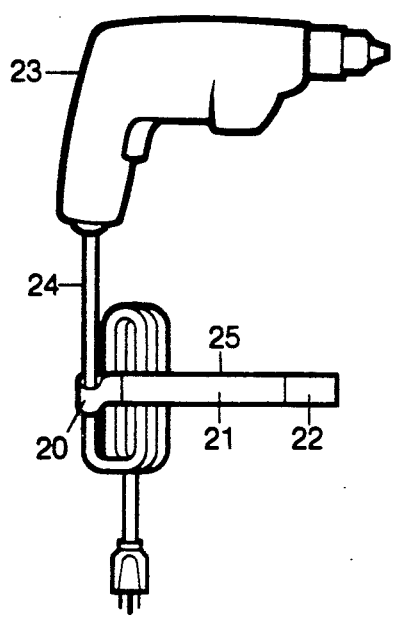

FIG. 4b illustrates the drill and power supply cord after it is coiled with the invention in position to be wrapped.

Figure 4C:
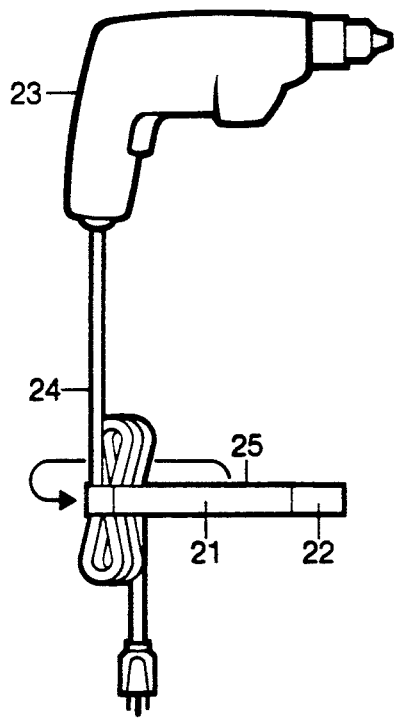

FIG. 4c indicates the direction of wrap for the type 1 device. The bundling process is the same for type 2 and 3 but the direction of wrap becomes optional because of their reversible nature.

Figure 4D:
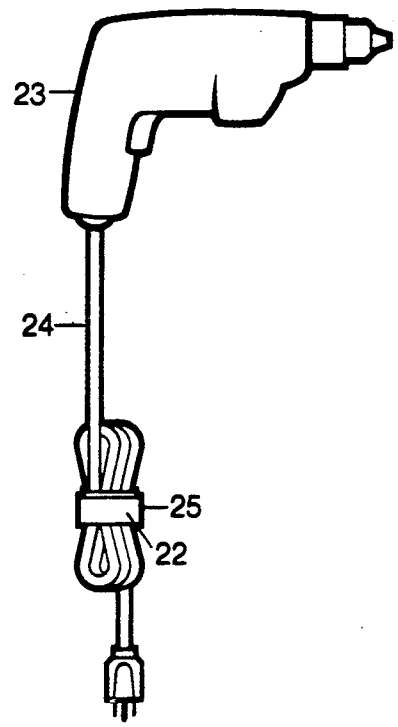
Figure 5A:
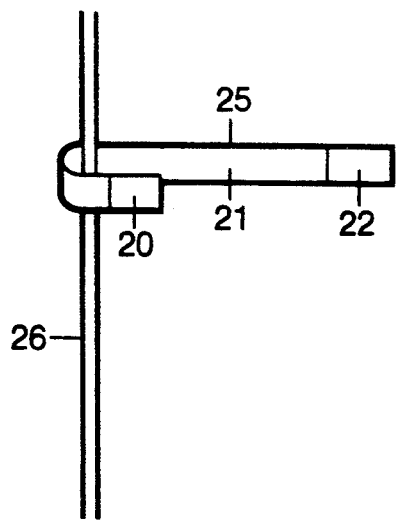
FIGS. 5a, 5b, 5c, and 5d show views of the device in four stages wrapping a lengthy flexible object.
Figure 5B:
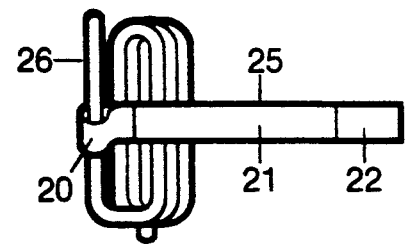
Figure 5C:
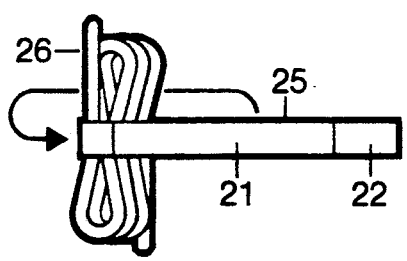
Figure 5D:
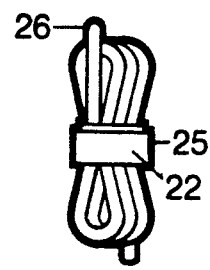

FIG. 4d shows the wrap repeating and progressing to completion. FIG. 4d illustrates the second end section 22 loop attached to the center section 21 hook with the wrap completed and the bundle secured.

FIGS. 5a, 5b, 5c, and 5d illustrate the process on a representation of cable, rope, hose, electrical extension cord or other lengthy flexible item in four progressive steps. The process is similar to the electric drill power supply cord example FIGS. 4a–d.

Figure 6:
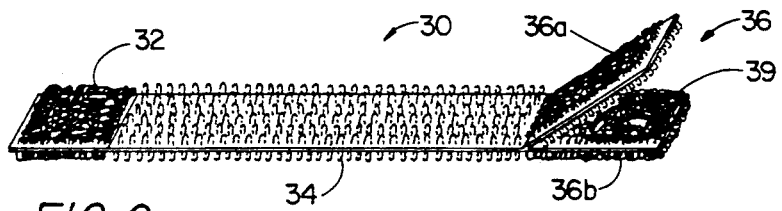
FIG. 6 shows an alternate embodiment having a two-piece end with an aperture in one of the pieces.

FIG. 6 illustrates another alternative embodiment of a bundling device 30 similar to that of device 4 of FIG. 3A. The bundling device 30 has a first end section 32 having loop material on both the top and bottom sides thereof, a center section 34 having loop material on the top and bottom sides thereof and a two-piece second end section attached to and extending outward from the end of the center section 34. The two-piece second end section 36 is comprised of a top piece 36a and a bottom piece 36b. The top piece 36a has loop material on the top surface thereof and hook material on the bottom surface thereof. The bottom piece 36b has loop material on both the top and bottom surfaces thereof and additionally has an aperture 39 passing generally through the center thereof. The aperture 39 accommodates the insertion of a device such as a chuck key in place within the aperture 39, the chuck key may be firmly held in place with the bundling device 30 remaining attached for example to the cord of an electric drill by the first end section 32.

Figure 7:
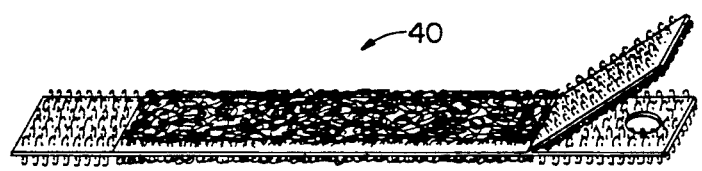
FIG. 7 shows a perspective front elevation view of a device similar to the one in FIG. 6 but having reversed location for the hook and loop materials.

FIG. 7 illustrates an alternate bundling device 40 of reverse construction of the device 30 of FIG. 6. The bundling device 40 is identical to that of bundling device 30 except for the reversal of the hook and loop material positions and therefore the description will not be repeated.

Figure 8:
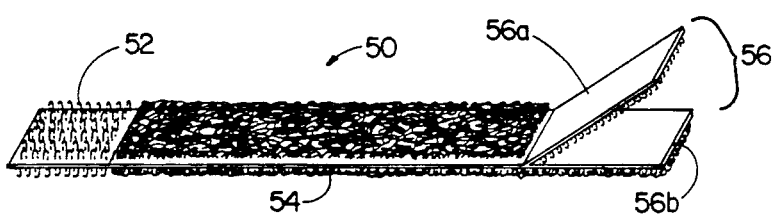
FIG. 8 shows a perspective front elevation view of an alternate embodiment having a two-piece attachment end.
Figure 8A:
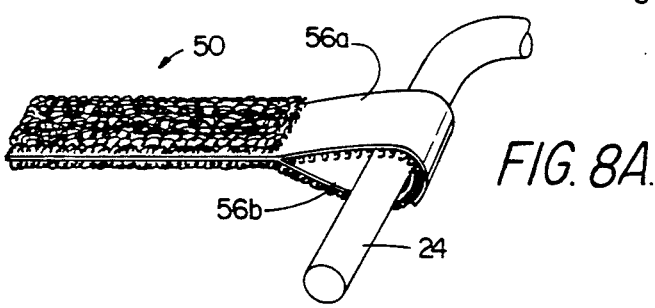
FIG. 8A shows a perspective front elevation view of a device similar to the one in FIG. 8 but having reversed location for the hook and loop materials.

FIG. 8 shows another alternative bundling device 50 having a first end section 52 having hook material on both the top and bottom sides thereof, a center section 54 having loop material on the top and bottom sides thereof and a two-piece second end section 56 attached to the end of the center section 54. The two-piece end section 56 has a top section 56a with a plain top surface and a bottom surface of hook material and a bottom section 56b has a plain top surface and a bottom surface of loop material. FIG. 8A illustrates an attachment method which may be used by the bundling device 50 of FIG. 8. The hook portion of the top portion 56a wraps around the top of a cord 24 and attaches to the loop portion on the bottom surface of the bottom section 56b providing a sure attachment to the cord 24. A cord 24 may then be bundled in similar fashion to that described previously with respect to FIGS. 4a–d.

Figure 9:
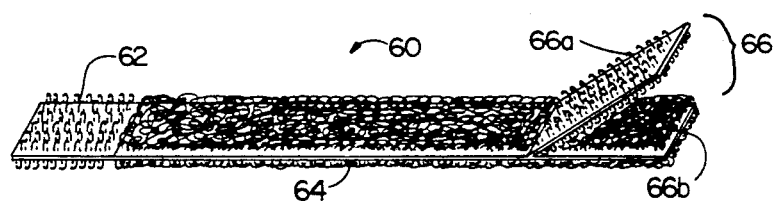
FIG. 9 shows a perspective front elevation view of another alternate embodiment having a two-piece attachment end.

FIG. 9 is yet another alternative embodiment of a bundling device 60 having a first end section 62 having loop portions on the top and bottom sides thereof, a center section 64 having loop portions on the top and bottom sides thereof and a two-piece end portion attached to the end of the center portion 64. The two-piece end section 66 as a top section 66a having hook fastening material on the top and bottom sides thereof and a bottom section 66b having loop material on the top and bottom sides thereof. Since the bottom section 66b has the same fastening material combination as the center section 64, the center section 64 and the bottom end section 66b may be made from one continuous piece with the top section 66a secured to an appropriate location. The top section 66a and the bottom end section 66b may conveniently grasp a cord or other lengthy items place therebetween.

Figure 10:
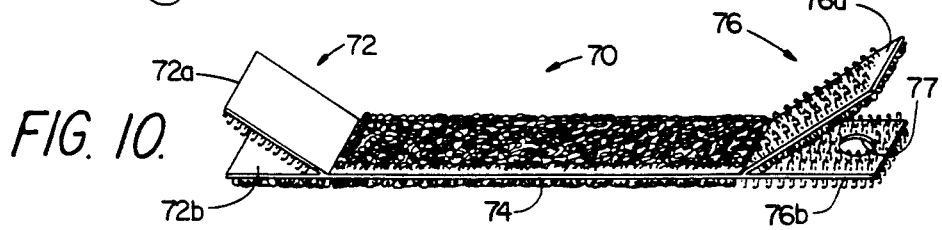
FIG. 10 s a perspective front elevation view of another alternate embodiment having a two-piece attachment end and a two-piece end with an aperture in one of the pieces.

FIG. 10 illustrates yet another alternative embodiment which is basically a combination of the two-piece ends of FIGS. 7 and 8. The bundling device 70 of FIG. 10 has a two-piece first end section 72, a center section 74, and a two-piece second end section 76. The first end section 72 comprises a top section 72a having hook material on the bottom surface thereof and a plain surface on the top thereof and a bottom section 72b with a plain top surface and loop material on the bottom surface thereof The center section 74 has loop material on the top and bottom surfaces thereof. The second end section 76 has a top section 76a with hook material on the top surface thereof and loop material on the bottom surface thereof and a bottom section 76b with hook material on the top and bottom surfaces thereof. The bottom section 76b also includes an aperture 77 into which a chuck key may be placed and held securely. The first end section 72 is capable of grasping a cord or other lengthy item in similar fashion to that illustrated in FIG. 8A.

The devices have been described having specific orientation of loop fastening material relative to hook fastening material. The reverse construction could be made switching the locations of the respective fastening materials as that accomplished with respect to FIGS. 3 and 3A and also with respect to FIGS. 6 and 7.

Thus a bundling device has been shown and described for wrapping around and thereby attaching to and securing the objects to be bundled, comprised of a single, independent strap, using no cinching rings, constructed in part or whole of materials designed to be self-attaching, assembled in such a way as to allow both end sections of the bundling device to be attached to more central sections of the bundling device. The above descriptions will indicate to those skilled in the art and others the considerable utility and versatility of the device.

While the above description contains many specificities, these should not be construed as limitations on the scope of the invention, but rather as an exemplification of preferred embodiments thereof. Many other variations and advantages may become obvious to one skilled in the art from the descriptions herein. For example, dimensions may be increased and the backing reinforced to provide for securing large or heavy bundles. The device may be attached to a fixed object and used to secure items to it. Accordingly, the scope of the invention should be determined not by the embodiments illustrated, but by the appended claims and their legal equivalents.

I claim:

1. A device for bundling object, comprising
a flexible strap member having a first end portion, a second end portion, and a center portion, the flexible strap member having a top side and a bottom side;
hook and loop type fastener sections on portions of the flexible strap member comprising
hook fastener sections on the top and bottom sides of the first end portion,
hook fastener sections on the top and bottom side of the second end portion, and
loop fastener sections on the top and bottom sides of the center portion.

2. A bundling device comprising a flexible strap member with a top surface and a bottom surface and having (a) a center portion, (b) a first end portion attached to one end of the center portion, and (c) a second end portion attached to the other end of the center portion,
the center portion having a first type fastening material on the top and bottom surfaces thereof,
the first end portion having a second type fastening material on the top and bottom surfaces thereof, and
the second end portion also having the second type fastening material on the bottom surface thereof,
wherein the first type fastening material on the center portion is selected from the group consisting of hook type fastening material and loop type fastening material and the second type fastening material on the first and second end portions is the fastening material other than that on the center portion.

3. A bundling device according to claim 1 wherein one of said end portions includes an aperture therethrough.

4. A bundling device according to claim 1 further comprising a first flap portion attached to the center portion at an interface between the center portion and the second end portion, the first flap portion having an outer surface and an inner surface which faces the second end portion, the outer surface having fastening material thereon.

5. A bundling device according to claim 4 wherein the fastening material on the outer surface of the first flap is fastening material other than that of the second end portion.

6. A bundling device according to claim 4 wherein the first flap portion includes fastening material on the inner surface thereof.

7. A bundling device according to claim 4 wherein an end portion includes an aperture therethrough.

8. A bundling device according to claim 4 further comprising a second flap portion attached to the center portion at an interface between the center portion and the first end portion, the second flap portion having an inner surface which faces the first end portion and an outer surface, the inner surface having fastening material thereon.

9. A bundling device according to claim 8 wherein the fastening material on the inner surface of the second flap portion is fastening material other than that of the first end portion.

10. A bundling device according to claim 8 wherein the outer surface of the second flap has fastening material thereon.

11. A bundling device according to claim 8 wherein an end portion includes an aperture therethrough.

12. A bundling device according to claim 1 wherein the second end portion also has the second type fastening material on the top surface thereof.

* * * * *